United States Patent
Iwanami (10) Patent No.: US 10,807,234 B2
(45) Date of Patent: Oct. 20, 2020

(54) COMPONENT SUPPLY DEVICE AND MACHINE LEARNING DEVICE

(71) Applicant: FANUC Corporation, Yamanashi (JP)

(72) Inventor: Motoshi Iwanami, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 231 days.

(21) Appl. No.: 16/022,738

(22) Filed: Jun. 29, 2018

(65) Prior Publication Data
US 2019/0009407 A1  Jan. 10, 2019

(30) Foreign Application Priority Data

Jul. 7, 2017 (JP) ................................. 2017-133810

(51) Int. Cl.
| | |
|---|---|
| *B25J 9/16* | (2006.01) |
| *B65G 43/00* | (2006.01) |
| *G06N 3/02* | (2006.01) |

(52) U.S. Cl.
CPC .............. *B25J 9/163* (2013.01); *B65G 43/00* (2013.01); *G05B 2219/39288* (2013.01)

(58) Field of Classification Search
CPC ........ B25J 9/0093; B25J 9/163; B25J 9/1679; B65G 3/041; B65G 27/04; B65G 47/1428;

(Continued)

(56) References Cited

U.S. PATENT DOCUMENTS

| 4,680,920 A | * | 7/1987 | Vere | ....................... G21C 21/00 |
|---|---|---|---|---|
| | | | | 376/261 |
| 6,056,108 A | * | 5/2000 | Buchi | .................... B25J 9/1697 |
| | | | | 198/395 |

(Continued)

FOREIGN PATENT DOCUMENTS

| CN | 102785046 A | 11/2012 |
|---|---|---|
| CN | 106612094 A | 5/2017 |

(Continued)

OTHER PUBLICATIONS

Office Action issued in Chinese Patent Application No. 201810737639.6, dated Apr. 14, 2020; 21 pgs; with English translation.

*Primary Examiner* — Paulinho E Smith
(74) *Attorney, Agent, or Firm* — Hauptman Ham, LLP (57) ABSTRACT

A machine learning device in a component supply device includes: a state observation unit, a determination data acquisition unit, and a learning unit. The state observation unit observes state variables representing a current state of an environment. The state variables include (i) vibration operation parameter data representing an operation parameters for a vibration operation of a tray, (ii) component arrangement data representing an arrangement and a posture of components on the tray, and (iii) component kind data representing a kind of the components. The determination data acquisition unit acquires determination data representing a suitability determination result of the vibration operation, which represents efficiency in supply of the components. The learning unit learns the operation parameters, the component arrangement data, and the component kind data while associating the operation parameters with the component arrangement data and the component kind data, by using the state variable and the determination data.

13 Claims, 8 Drawing Sheets

(58) Field of Classification Search
CPC ... B65G 47/252; B65G 43/00; G05B 19/4182
See application file for complete search history.

(56) References Cited

U.S. PATENT DOCUMENTS

| | | | | |
|---|---|---|---|---|
| 6,116,409 | A * | 9/2000 | Yokajty | B65G 47/1492 |
| | | | | 198/539 |
| 8,271,134 | B2 * | 9/2012 | Kato | B25J 9/163 |
| | | | | 700/253 |
| 9,095,475 | B2 * | 8/2015 | Takai | A61F 13/2085 |
| 9,776,808 | B1 * | 10/2017 | Ooba | B65G 47/1428 |
| 9,896,273 | B2 * | 2/2018 | Motowaki | B25J 19/023 |
| 10,082,771 | B2 * | 9/2018 | Nakazawa | G06N 3/084 |
| 10,259,118 | B2 * | 4/2019 | Washizu | B25J 9/1679 |
| 10,399,257 | B1 * | 9/2019 | Xie | B65G 17/345 |
| 10,444,731 | B2 * | 10/2019 | Horiguchi | G05B 19/4083 |
| 10,596,707 | B2 * | 3/2020 | Katagiri | B25J 9/1697 |
| 2012/0296471 | A1 | 11/2012 | Inaba et al. | |
| 2017/0063284 | A1 | 3/2017 | Matsumoto et al. | |
| 2017/0117841 | A1 | 4/2017 | Watanabe et al. | |
| 2018/0321111 | A1 * | 11/2018 | Matsumoto | B06B 1/045 |
| 2019/0009407 | A1 * | 1/2019 | Iwanami | B65G 43/00 |
| 2019/0119053 | A1 * | 4/2019 | Deng | B65G 65/44 |

FOREIGN PATENT DOCUMENTS

| | | |
|---|---|---|
| JP | H11-180538 A | 7/1999 |
| JP | 2017-30097 A | 2/2017 |
| JP | 2017-45406 A | 3/2017 |

\* cited by examiner

COMPONENT SUPPLY DEVICE AND MACHINE LEARNING DEVICE

RELATED APPLICATIONS

The present application claims priority of Japanese Application Number 2017-133810, filed on Jul. 7, 2017, the disclosure of which is hereby incorporated by reference herein in its entirety.

BACKGROUND OF THE INVENTION

1. Field of the Invention

The present invention relates to a component supply device and a machine learning device and especially relates to a component supply device and a machine learning device that optimize operation parameters.

2. Description of the Related Art

In a production line for product assembling, an assembling robot sometimes takes out a component placed on a pallet and incorporates the component in a product, for example. Components are placed on the pallet with their postures (two sides or directions) uniformed so that the assembling robot easily grips the components. Supply of such components exhibiting uniformed postures is performed by a component supply device (Japanese Patent Application Laid-Open No. 2017-030097, for example).

Figure 9:
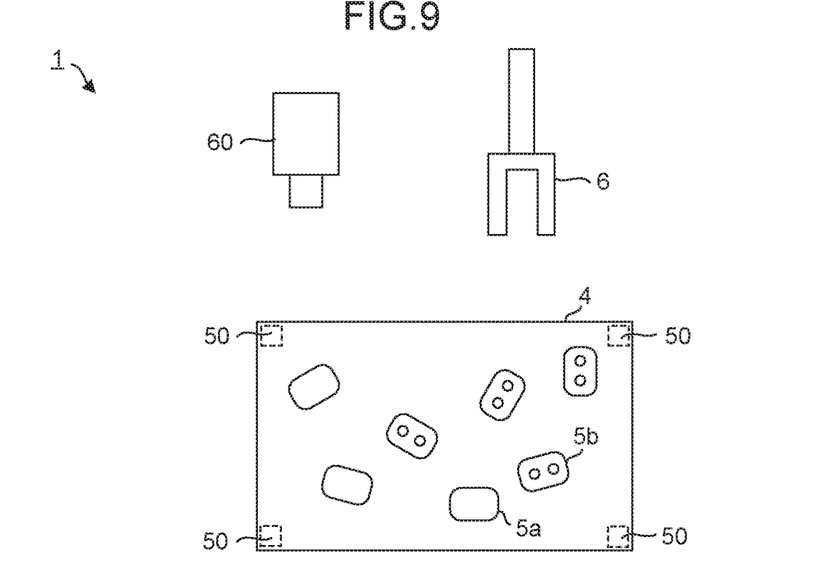
FIG. 9 illustrates a partial configuration of the component supply device.

FIG. 9 illustrates a partial configuration of a component supply device. As illustrated in FIG. 9, placement of components 5 onto a pallet (not illustrated) by a component supply device 1 is performed such that a robot 6 takes the components 5, which are scattered randomly on a tray 4, and places the components 5 on the pallet while conforming postures of the components 5 to each other, for example. On the tray 4, components 5a whose front sides face upward and components 5b whose back sides face upward are scattered. The component supply device 1 detects a state of each of the components 5 by an imaging unit 60 which picks up an image of the tray 4 from the upper side and grips and takes the components 5a, which have front sides facing upward and are easily gripped, by the robot 6 so as to place the components 5a on the pallet.

As the operation for transferring the components 5 to the pallet as described above is continued, the components 5a whose front sides face upward are reduced to zero on the tray 4. Therefore, vibration units 50 composed of an actuator such as a voice coil and a cylinder are provided on four corners, for example, of the tray 4. When the rate of the components 5b, whose back sides face upward, is increased among the components 5 on the tray 4, the component supply device 1 makes each of the vibration units 50 vibrate at a predetermined magnitude and a predetermined frequency with a predetermined phase difference for a predetermined period of time so as to turn over the components 5b, which are reversed on the tray 4, or shift the components 5, which are located on edges of the tray 4 and thus are not easily gripped, to the center of the tray. Thus, the component supply device 1 tries to render the components 5 on the tray 4 grippable. Further, when the number of the components on the tray 4 is decreased to some extent, the component supply device 1 newly supplies components onto the tray 4 by a component feeding device which is not illustrated.

The above-described tray vibration operation by the component supply device 1 is performed based on operation parameters (a magnitude of vibration, a frequency of vibration, a phase difference in vibration, time of vibration, and the like). Operation parameters by which postures of components on the tray 4 can be efficiently changed into postures, in which the components are easily gripped, vary depending on weights, sizes, and shapes of components, for example, so that a skilled operator has to set the operation parameters through trial and error. Thus, setting of operation parameters imposes a substantial burden in an operation process.

SUMMARY OF THE INVENTION

An object of the present invention is to provide a component supply device and a machine learning device which are capable of automatically adjusting operation parameters for a tray vibration operation.

The component supply device according to the present invention solves the above-mentioned problem such that the component supply device performs machine-learning of operation parameters of a vibration unit (excitation unit), which vibrates a tray, with respect to kinds of components (weights, sizes, and shapes) and an arrangement of the components on the tray and efficiently changes postures of the components arranged on the tray into postures in which the components are easily gripped, based on the result of the machine-learning.

According to an aspect of the present invention, a component supply device that supplies components placed on a tray and determines an operation parameters for a vibration operation, by which an arrangement and a posture of the components placed on the tray are changed, of the tray includes a machine learning device that learns the operation parameters for the vibration operation. The machine learning device includes: a state observation unit that observes vibration operation parameter data representing the operation parameters for the vibration operation and component arrangement data representing an arrangement and a posture of the components on the tray, as a state variable representing a current state of an environment; a determination data acquisition unit that acquires determination data representing a suitability determination result of the vibration operation, which represents efficiency in supply of the components; and a learning unit that learns the operation parameters for the vibration operation and the component arrangement data while associating the operation parameters for the vibration operation with the component arrangement data, by using the state variable and the determination data.

According to another aspect of the present invention, a machine learning device that learns an operation parameters for a vibration operation, by which an arrangement and a posture of components placed on a tray are changed, of the tray in a component supply device for supplying the components placed on the tray, includes: a state observation unit that observes vibration operation parameter data representing the operation parameters for the vibration operation, component arrangement data representing an arrangement and a posture of the components on the tray, and component kind data representing a kind of the components, as a state variable representing a current state of an environment; a determination data acquisition unit that acquires determination data representing a suitability determination result of the vibration operation, which represents efficiency in supply of the components; and a learning unit that learns the operation parameters for the vibration operation, the component arrangement data, and the component kind data while associating the operation parameters for the vibration operation with the component arrangement data and the component kind data, by using the state variable and the determination data.

The present invention realizes rapid setting of operation parameters for efficiently changing postures of components, which are arranged on the tray of the component supply device, into postures in which the components are easily gripped.

BRIEF DESCRIPTION OF THE DRAWINGS

The above-described and other objects and features of the present invention will be apparent from the following embodiments which are described in reference to the accompanying drawings. Among these drawings.

DETAILED DESCRIPTION OF THE PREFERRED EMBODIMENTS

Embodiments of the present invention will be described below with reference to the accompanying drawings.

Figure 1:
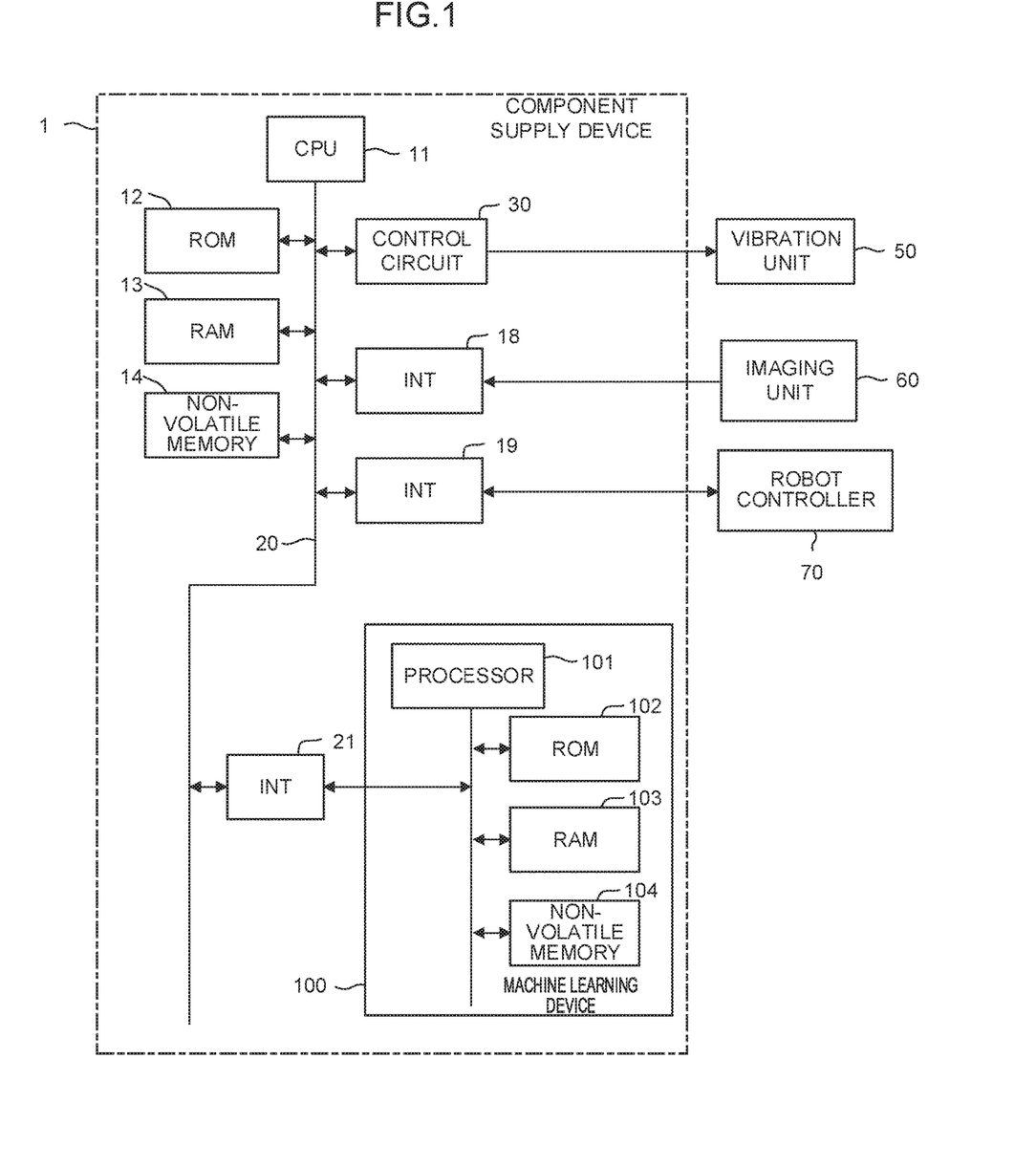
FIG. 1 is a schematic hardware configuration diagram illustrating a component supply device according to the first embodiment.

FIG. 1 is a schematic hardware configuration diagram illustrating chief parts of a component supply device according to the first embodiment. A component supply device 1 can be mounted as a component supply device for supplying components to an industrial robot (not illustrated) which assembles electronic components, for example. A CPU 11 included in the component supply device 1 according to the present embodiment is a processor for entirely controlling the component supply device 1. The CPU 11 reads out a system program stored in a ROM 12 via a bus 20 and controls the whole of the component supply device 1 in accordance with the system program. In a RAM 13, transient calculation data or display data, various types of data which are inputted by an operator via an input unit, which is not illustrated, and the like are temporarily stored.

A non-volatile memory 14 is configured as a memory which is backed up by a battery, which is not illustrated, for example, and thus a storage state thereof is maintained even when the component supply device 1 is turned off. The non-volatile memory 14 stores various types of data (operation parameters such as a magnitude and a frequency of vibration of the vibration unit 50, time of vibration, and a phase difference, kinds of components to be supplied, and weights, shapes, and sizes of the components, for example) which are inputted by an operator via an input unit, which is not illustrated, a control program which is inputted via an interface, which is not illustrated, and the like. The program and various types of data stored in the non-volatile memory 14 may be expanded in the RAM 13 when the program and the data are executed or used. In the ROM 12, various types of system programs, such as a known analysis program for analyzing an arrangement and postures of components on the tray 4 based on an image picked up by the imaging unit 60, (including a system program for controlling communication with a machine learning device 100 which will be described later) are preliminarily written.

A control circuit 30 controls the vibration unit 50 provided to the tray 4 in response to a command from the CPU 11. The control circuit 30 may be configured to be capable of controlling a magnitude of vibration (amplitude) and a frequency of vibration of the vibration unit 50, for example. In addition, the control circuit 30 may be configured to be capable of controlling time in which the vibration unit 50 vibrates. Here, four pieces of vibration units 50 are provided to the tray 4 in the above-mentioned prior art technique, but postures of the components 5 on the tray 4 can be controlled by at least one vibration unit 50. In the case where a plurality of vibration units 50 are provided to the tray 4, the control circuit 30 may be configured to be capable of controlling a phase difference/phase differences among the vibration units 50.

The imaging unit 60 picks up an image of the components 5 arranged on the tray 4. The imaging unit 60 may be capable of picking up an image of at least a region, in which the components 5 are arranged, of the tray 4. The imaging unit 60 transfers a picked-up image of the tray 4 to the CPU 11 via an interface 18.

A robot controller 70 is a control device for controlling a robot which transfers the components 5 arranged on the tray 4 to a pallet or the like. The robot controller 70 controls the robot via an interface 19 so that the robot transfers the components 5, which are easily gripped, on the tray 4 to a pallet or the like, based on an analysis result of an image of the tray 4 picked up by the imaging unit 60. Further, the robot controller 70 notifies the CPU 11 of an operation state of the robot via the interface 19 as appropriate.

An interface 21 is an interface for connecting the component supply device 1 with the machine learning device 100. The machine learning device 100 includes a processor 101 for controlling the whole of the machine learning device 100, a ROM 102 which stores a system program and the like, a RAM 103 for performing temporary storage in each processing related to machine learning, and a non-volatile memory 104 used for storing a learning model or the like. The machine learning device 100 is capable of observing various information (operation parameters of the vibration unit 50, analysis results of an arrangement and postures of components on the tray 4 obtained by the imaging unit 60, kinds of components, and weights, shapes, and sizes of the component, for example) which can be acquired by the component supply device 1, via the interface 21. The component supply device 1, for example, sets operation parameters of the vibration unit 50 which are stored in the non-volatile memory 14, in response to a command, which is outputted from the machine learning device 100, for setting the operation parameters of the vibration unit 50.

Figure 2:
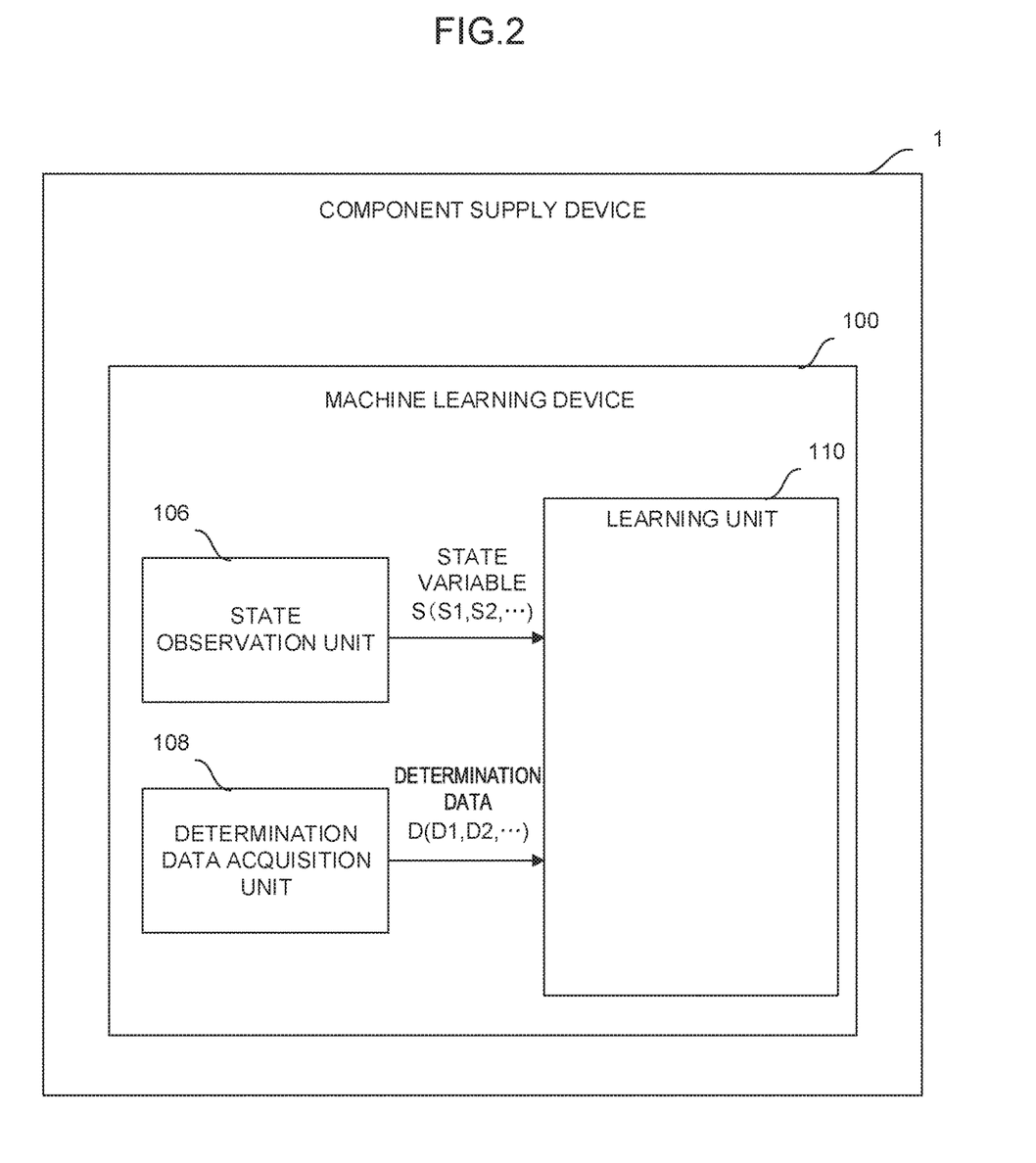
FIG. 2 is a schematic functional block diagram illustrating the component supply device according to the first embodiment.

FIG. 2 is a schematic functional block diagram illustrating the component supply device 1 and the machine learning device 100 according to the first embodiment. The machine learning device 100 includes software (a learning algorithm and the like) and hardware (the processor 101 and the like) by which the machine learning device 100 learns operation parameters of the vibration unit 50 with respect to an arrangement and postures of components on the tray 4 and kinds of the components through so-called machine learning by itself. What the machine learning device 100 included in the component supply device 1 learns corresponds to a model structure representing a correlation of an arrangement and postures of components on the tray 4 and kinds of the components with respect to operation parameters of the vibration unit 50.

As illustrated in the functional block of FIG. 2, the machine learning device 100 included in the component supply device 1 includes a state observation unit 106, a determination data acquisition unit 108, and a learning unit 110. The state observation unit 106 observes a current state of an environment as state variables S including vibration operation parameter data S1 representing operation parameters of the vibration unit 50, component arrangement data S2 representing an arrangement and postures of components on the tray 4, and component kind data S3 representing kinds of components. The determination data acquisition unit 108 acquires determination data D including vibration operation determination data D1 which represents a suitability determination result of a tray vibration operation in the case where operation parameters of the vibration unit 50 are set. The learning unit 110 performs learning while associating an arrangement and postures of components on the tray 4 and kinds of the components with the vibration operation parameter data S1 by using the state variables S and the determination data D.

The state observation unit 106 may be configured as one function of the processor 101, for example. Alternatively, the state observation unit 106 may be configured as software which is used for making the processor 101 function and is stored in the ROM 102, for example. The vibration operation parameter data S1 among the state variables S observed by the state observation unit 106 can be acquired as a set of operation parameters used for controlling the vibration unit 50. As operation parameters used for controlling the vibration unit 50, a magnitude of vibration, a frequency of vibration, and the like are illustrated, and vibration time, a phase difference among a plurality of vibration units 50, and the like may also be employed as appropriate. Such operation parameters used for controlling the vibration unit 50 may be appropriately set depending on a kind of an actuator used for the vibration unit 50 and an installation state of the vibration unit 50 with respect to the tray 4.

As the vibration operation parameter data S1, operation parameters of the vibration unit 50 which are provided to the component supply device 1 through proposition by a skilled operator, for example, may be used in an initial stage of learning. Further, on a stage at which the learning is advanced to some extent, operation parameters of the vibration unit 50 which are determined by the machine learning device 100 in a preceding learning period based on a learning result obtained by the learning unit 110 may be used as the vibration operation parameter data S1. In such case, the machine learning device 100 may temporarily store determined operation parameters of the vibration unit 50 in the RAM 103 every learning period and the state observation unit 106 may acquire the operation parameters of the vibration unit 50, which are determined by the machine learning device 100 in a preceding learning period, from the RAM 103.

As the component arrangement data S2 among the state variables S, data which is related to an arrangement and postures of components on the tray 4 and is analyzed based on an image picked up by the imaging unit 60, for example, may be used. Here, as for an arrangement of components as the component arrangement data S2, coordinate values of respective components on a coordinate system obtained by using a predetermined position on the tray 4 as a reference may be used. Further, as for postures of components as the component arrangement data S2, data simply representing whether a front side or a back side of each component faces up may be used or more minutely, angular deflection of each component viewed from a direction of a reference component may be used.

As the component kind data S3 among the state variables S, kinds of components set by an operator, for example, with respect to the component supply device 1 may be used. Further, weights or shapes of components or sizes of components may be used as the component kind data S3 in accordance with a purpose. In the former case, operation parameters of the vibration unit 50 can be learned for every kind of components. Meanwhile, operation parameters of the vibration unit 50 related to similar weights, shapes, and sizes of components can be learned in the latter case.

The determination data acquisition unit 108 can be configured as one function of the processor 101, for example. Alternatively, the determination data acquisition unit 108 may be configured as software which is used for making the processor 101 function and is stored in the ROM 102, for example. The determination data acquisition unit 108 may use the vibration operation determination data D1 which is a suitability determination value of the tray vibration operation in the case where operation parameters of the vibration unit 50 are set, as the determination data D. The determination data acquisition unit 108 may use time (cycle time) taken for supplying a predetermined number of pieces of components from the tray 4 (an operation for transferring components by a robot) or the number of pieces of components which are able to be supplied from the tray 4 within a predetermined period of time, as the vibration operation determination data D1. The determination data D is an index representing a result of component supply efficiency in the case where the tray vibration operation is performed based on the state variables S.

When considered based on a learning period by the learning unit 110, the state variables S simultaneously inputted into the learning unit 110 are based on data of a preceding learning period in which the determination data D is acquired. Thus, while the machine learning device 100 included in the component supply device 1 advances learning, acquisition of the component arrangement data S2 and the component kind data S3, execution of the tray vibration operation based on the vibration operation parameter data S1, and acquisition of the determination data D are repeatedly performed in an environment.

The learning unit 110 may be configured as one function of the processor 101, for example. Alternatively, the learning unit 110 may be configured as software which is used for making the processor 101 function and is stored in the ROM 102, for example. The learning unit 110 learns the vibration operation parameter data S1 with respect to an arrangement and postures of components on the tray 4 and kinds of the components in accordance with an arbitrary learning algorithm which is collectively called machine learning. The learning unit 110 is capable of repeatedly executing learning based on a data set including the state variables S and the determination data D which are described above. During repetition of a cycle of the learning of the vibration operation parameter data S1 with respect to an arrangement and postures of components on the tray 4 and kinds of the components, the component arrangement data S2 and the component kind data S3 among the state variables S are acquired from an analysis result of an image, which is picked up by the imaging unit 60 in the preceding learning period as described above, or information related to components which is set in the non-volatile memory 14, the vibration operation parameter data S1 is set as operation parameters of the vibration unit 50 which are determined based on results up to the preceding learning, and the determination data D is set as a suitability determination result of the tray vibration operation in a current learning period which is executed after setting of operation parameters of the vibration unit 50 based on the vibration operation parameter data S1.

Through repetition of such learning cycle, the learning unit 110 can automatically identify a feature indicating a correlation of an arrangement and postures of components on the tray 4 (the component arrangement data S2) and kinds of the components (the component kind data S3) with respect to operation parameters of the vibration unit 50 corresponding to this state. Though the correlation of the component arrangement data S2 and the component kind data S3 with respect to operation parameters of the vibration unit 50 is substantailly unknown at the start of the learning algorithm, the learning unit 110 gradually identifies features as the learning unit 110 advances the learning and thus interprets the correlation. When the correlation of the component arrangement data S2 and the component kind data S3 with respect to operation parameters of the vibration unit 50 is interpreted to some reliable level, a learning result which is repeatedly outputted by the learning unit 110 goes to a usable level for performing selection (that is, decision-making) of an action for setting values of operation parameters of the vibration unit 50 with respect to a current state (that is, an arrangement and postures of components on the tray 4 and kinds of the components). That is, the learning unit 110 is capable of gradually bringing the correlation of an arrangement and postures of components on the tray 4 and kinds of the components with respect to an action for setting values of operation parameters of the vibration unit 50 in the corresponding state, to an optimal solution along with advancement of the learning algorithm.

As described above, the learning unit 110 of the machine learning device 100 included in the component supply device 1 learns operation parameters of the vibration unit 50 in accordance with the machine learning algorithm by using the state variables S observed by the state observation unit 106 and the determination data D acquired by the determination data acquisition unit 108. The state variable S is composed of data, which is unlikely affected by disturbance, such as the vibration operation parameter data S1, the component arrangement data S2, and the component kind data S3 and the determination data D is uniquely obtained by analyzing an image picked up by the imaging unit 60 included in the component supply device 1. Thus, according to the machine learning device 100 included in the component supply device 1, operation parameters of the vibration unit 50 corresponding to an arrangement and postures of components on the tray 4 and kinds of the components can be automatically and accurately obtained by using learning results of the learning unit 110 without depending on calculation or estimation.

If operation parameters of the vibration unit 50 can be automatically obtained without depending on calculation or estimation, appropriate values of operation parameters of the vibration unit 50 can be rapidly determined only by grasping an arrangement and postures of components on the tray 4 (the component arrangement data S2) and kinds of the components (the component kind data S3). Thus, operation parameters of the vibration unit 50 can be efficiently determined.

As a modification of the machine learning device 100 included in the component supply device 1, the determination data acquisition unit 108 may use fallen component number determination data D2, which represents the number of components fallen from the tray 4 after a vibration operation, as the determination data D. The fallen component number determination data D2 can be acquired from an analysis result obtained by analyzing an image picked up by the imaging unit 60 (a difference between the number of pieces of components on the tray 4 before the vibration operation and the number of pieces of components after the vibration operation, for example).

According to the above-described modification, the machine learning device 100 is capable of taking into account the number of pieces of components fallen from the tray 4 as a negative evaluation in learning of operation parameters of the vibration unit 50 with respect to an arrangement and postures of components on the tray 4 and kinds of the components.

As another modification of the machine learning device 100 included in the component supply device 1, the learning unit 110 is capable of learning operation parameters of the vibration units 50 in a plurality of component supply devices 1 which perform identical operations by using the state variable S and the determination data D which are obtained for each of the component supply devices 1. This configuration can increase the amount of data sets which can be obtained in a certain period of time and includes the state variables S and the determination data D, so that speed and reliability of learning of operation parameters of the vibration unit 50 can be improved with inputs of more various data sets.

Figure 3:
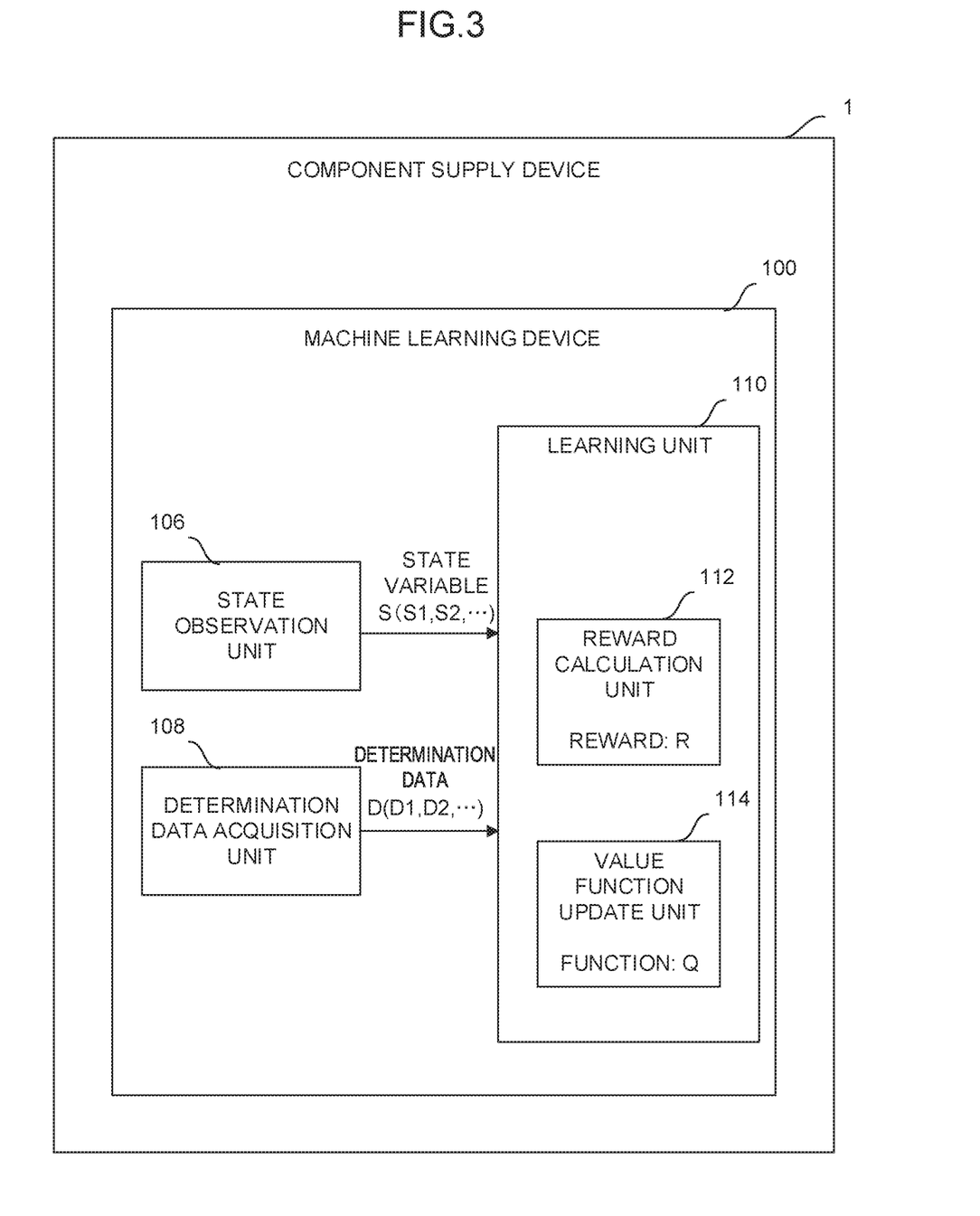
FIG. 3 is a schematic functional block diagram illustrating an aspect of the component supply device.

In the machine learning device 100 having the above-described configuration, a learning algorithm executed by the learning unit 110 is not especially limited but a known learning algorithm can be employed as machine learning. FIG. 3 illustrates an aspect of the component supply device 1 illustrated in FIG. 1 and illustrates the configuration including the learning unit 110 which executes reinforcement learning as an example of the learning algorithm. The reinforcement learning is a method in which a cycle, in which a predetermined action (that is, an output) is executed in a current state of an environment in which a learning object exists while observing the current state (that is, an input) and some reward is imparted with respect to the action, is repeated through trial and error so as to learn measures, by which a total reward is maximized, (determination of operation parameters of the vibration unit 50 in the machine learning device in the present application) as an optimal solution.

In the machine learning device 100 included in the component supply device 1 illustrated in FIG. 3, the learning unit 110 includes a reward calculation unit 112 and a value function update unit 114. The reward calculation unit 112 obtains reward R related to a suitability determination result (corresponding to the determination data D used in the following learning period of a period in which the state variables S are acquired) of the tray vibration operation in the case where operation parameters of the vibration unit 50 are set based on the state variables S. The value function update unit 114 updates function Q representing values of operation parameters of the vibration unit 50, by using the reward R. The learning unit 110 learns operation parameters of the vibration unit 50 with respect to an arrangement and postures of components on the tray 4 and kinds of the components, through repeated update of the function Q performed by the value function update unit 114.

An example of an algorithm of the reinforcement learning executed by the learning unit 110 will be described. The algorithm in this example is known as Q-learning and is a method for learning the function Q(s,a) representing a value of an action in the case action a is selected in a state s when the state s of an action subject and the action a which can be selected by the action subject in the state s are set as independent variables. To select the action a to which the value function Q reaches the highest in the state s is an optimal solution. The Q-learning is started in a state in which a correlation between the state s and the action a is unknown and trial and error in selection of various actions a are repeated in an arbitrary state s. Thus, the value function Q is repeatedly updated so as to approach the optimal solution. Here, the configuration is employed in which when an environment (that is, the state s) is changed as a result of selection of the action a in the state s, reward r (that is, weighting of the action a) corresponding to the change can be obtained, and the learning is guided so as to select the action a by which higher reward r can be obtained. Thus, the value function Q can be approximated to the optimal solution in a relatively short period of time.

An update formula of the value function Q can be generally expressed as Formula 1 below. In Formula 1, $s_t$ and $a_t$ respectively denote a state and an action at time t and the state is changed to $s_{t+1}$ depending on the action $a_t$. $r_{t+1}$ denotes reward which is obtained when the state is changed from $s_t$ to $s_{t+1}$. A term of maxQ denotes Q obtained when the action a, in which the maximum value Q is obtained at time t+1 (it is considered at time t that the maximum value Q is obtained at time t+1), is performed. α and γ respectively denote a learning coefficient and a discount rate and are arbitrarily set as 0<α≤1 and 0<γ≤1.

$$Q(s_t, a_t) \leftarrow Q(s_t, a_t) + \alpha\left(r_{t+1} + \gamma \max_a Q(s_{t+1}, a) - Q(s_t, a_t)\right)$$ [Formula 1]

In the case where the learning unit 110 executes the Q-learning, the state variable S observed by the state observation unit 106 and the determination data D acquired by the determination data acquisition unit 108 correspond to the state s in an update formula, the way to determine operation parameters of the vibration unit 50 corresponding to a current state (that is, an arrangement and postures of components on the tray 4 and kinds of the components) corresponds to the action a in the update formula, and the reward R obtained by the reward calculation unit 112 corresponds to the reward r in the update formula. Accordingly, the value function update unit 114 repeatedly updates the function Q representing values of operation parameters of the vibration unit 50 corresponding to a current state by the Q-learning using the reward R.

In the case where, when the tray vibration operation is performed based on determined operation parameters after determination of the operation parameters of the vibration unit 50, a suitability determination result of the tray vibration operation is determined as "suitable" (the case where cycle time in which a predetermined number of pieces of components are supplied is within an allowable range, the case where the number of pieces of components supplied in a predetermined period of time is equal to or higher than the allowable number, or the like), for example, the reward R obtained by the reward calculation unit 112 may be set as positive (plus) reward R. In the case where, when the tray vibration operation is performed based on determined operation parameters after determination of the operation parameters of the vibration unit 50, a suitability determination result of the tray vibration operation is determined as "unsuitable" (the case where cycle time in which a predetermined number of pieces of components are supplied exceeds an allowable range, the case where the number of pieces of components supplied in a predetermined period of time is lower than the allowable number, or the like), for example, the reward R obtained by the reward calculation unit 112 may be set as negative (minus) reward R. Absolute values of the positive and negative rewards R may be identical to each other or different from each other. As for a condition of the determination, the determination may be performed by combining a plurality of values included in the determination data D.

Further, a suitability determination result for an operation of a robot may be set not only in two ways which are "suitable" and "unsuitable" but also in multiple stages. As an example, in the case where the maximum value of the allowable range of the cycle time in which a predetermined number of pieces of components are supplied is $T_{max}$, the configuration may be employed in which reward R=5 is imparted when cycle time T in which a predetermined number of pieces of components are supplied is $0 \leq T < T_{max}/5$, reward R=2 is imparted when the cycle time T is $T_{max}/5 \leq T < T_{max}/2$, and reward R=1 is imparted when the cycle time T is $T_{max}/2 \leq T \leq T_{max}$. Further, the configuration may be employed in which $T_{max}$ is set relatively large in the initial stage of the learning and $T_{max}$ is reduced along with advancement of the learning.

The value function update unit 114 can have an action value table in which the state variables S, the determination data D, and the rewards R are organized while being associated with action values (for example, numeral values) expressed by the function Q. In this case, an action for updating the function Q by the value function update unit 114 is synonymous with an action for updating the action value table by the value function update unit 114. Since the correlation between a current state of an environment and operation parameters of the vibration unit 50 is unknown at the start of the Q-learning, various state variables S, determination data D, and rewards R are prepared in a manner to be associated with values of action values (functions Q) defined on a random basis in the action value table. The reward calculation unit 112 is capable of calculating the reward R corresponding to determination data D as soon as the reward calculation unit 112 gets to know the determination data D, and the calculated value R is written in the action value table.

As the Q-learning is advanced by using the reward R corresponding to a suitability determination result of the operation state of a robot, the learning is guided to select an action for which higher reward R can be obtained, and a value of the action value (function Q) for an action performed in a current state is rewritten in accordance with a state of an environment (that is, the state variable S and the determination data D) which is changed as a result of execution of the selected action in the current state. Thus, the action value table is updated. By repeating this update, a value of an action value (function Q) displayed on the action value table is rewritten to be a larger value as an action is more appropriate. Thus, a correlation between a current state of an environment which has been unknown (an arrangement and postures of components on the tray 4 and kinds of the components) and a corresponding action (determination of operation parameters of the vibration unit 50) gradually becomes apparent. That is, a relation of an arrangement and postures of components on the tray 4 and kinds of the components with respect to operation parameters of the vibration unit 50 is gradually approximated to an optimal solution through update of the action value table.

Figure 4:
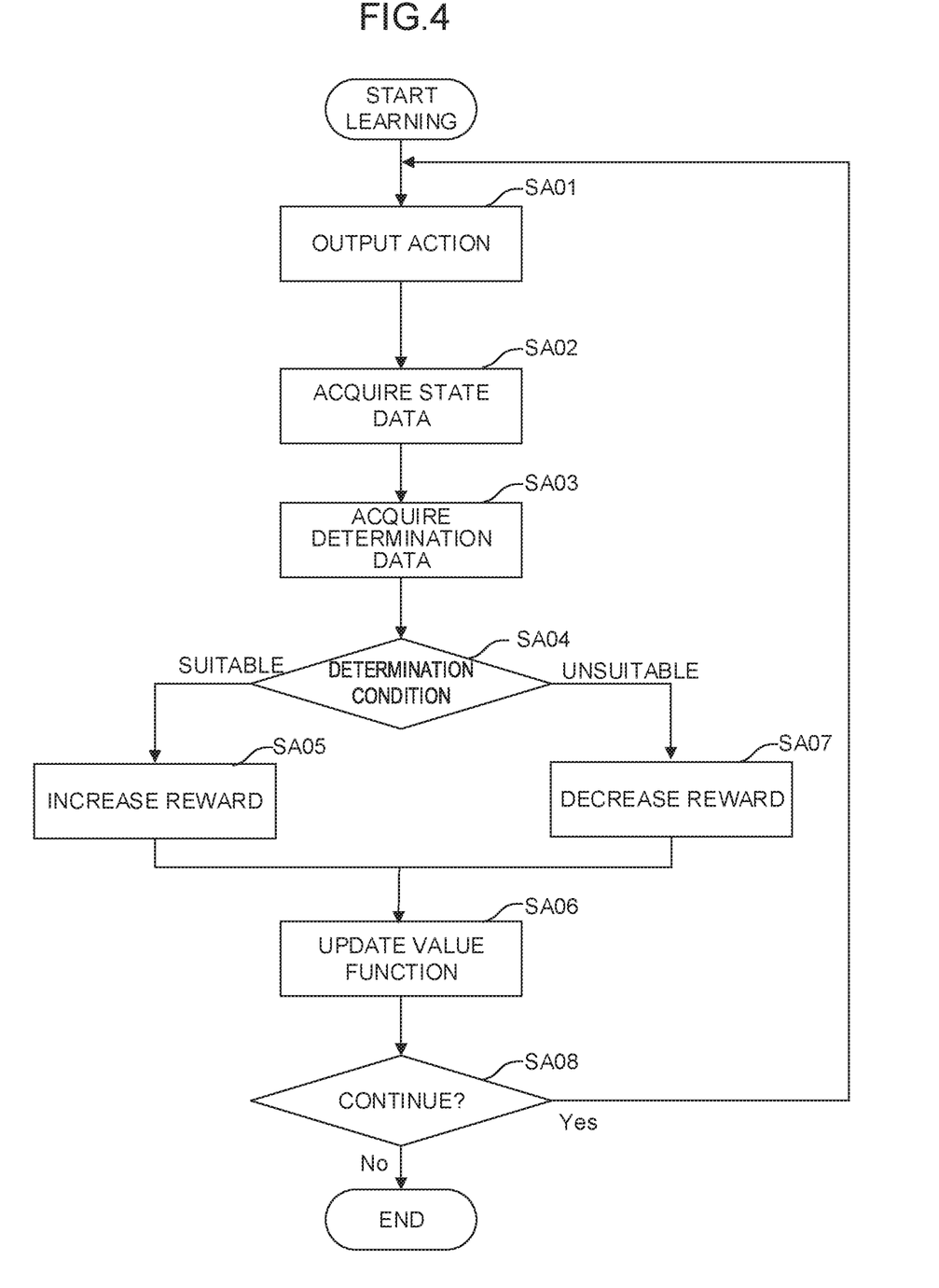
FIG. 4 is a schematic flowchart illustrating an aspect of a machine learning method.

A flow of the above-described Q-learning executed by the learning unit 110 (that is, an aspect of the machine learning method) is further described in reference to FIG. 4. First, in step SA01, the value function update unit 114 selects operation parameters of the vibration unit 50 at random as an action, which is performed in a current state represented by the state variable S observed by the state observation unit 106, while referring to the action value table at that time. Then, the value function update unit 114 takes in the state variable S of the current state observed by the state observation unit 106 in step SA02 and takes in the determination data D of the current state acquired by the determination data acquisition unit 108 in step SA03. Subsequently, the value function update unit 114 determines whether or not the operation parameters of the vibration unit 50 are suitable, based on the determination data D in step SA04. In the case where the operation parameters of the vibration unit 50 are suitable, the positive reward R obtained by the reward calculation unit 112 is applied to an update formula of the function Q in step SA05 and then, the action value table is updated by using the state variable S, the determination data D, the reward R, and the value of the action value (the function Q after update) in the current state in step SA06. In the case where it is determined in step SA04 that the operation parameters of the vibration unit 50 are not suitable, the negative reward R obtained by the reward calculation unit 112 is applied to the update formula of the function Q in step SA07 and then, the action value table is updated by using the state variable S, the determination data D, the reward R, and the value of the action value (the function Q after update) in the current state in step SA06. The learning unit 110 repeatedly updates the action value table by repeating steps SA01 to SA07 so as to advance the learning of operation parameters of the vibration unit 50. Here, the processing for obtaining the reward R and the processing for updating the value function performed from step SA04 to step SA07 are executed for each data included in the determination data D.

Figure 5A:
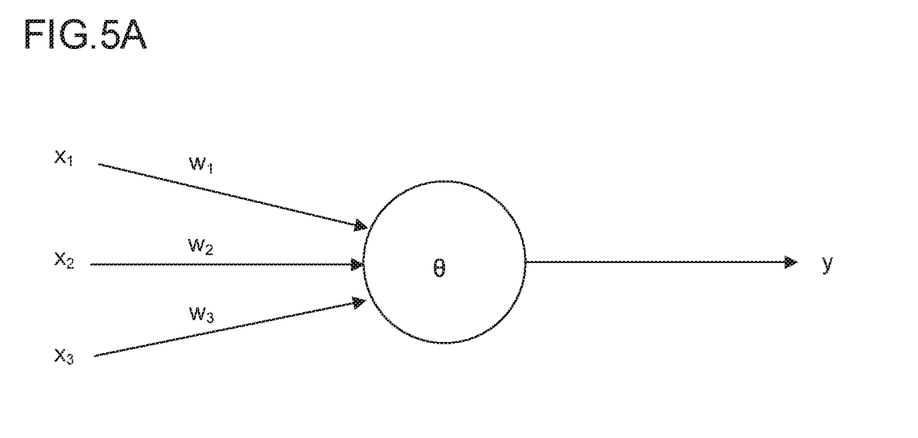
FIG. 5A illustrates a neuron.
Figure 5B:
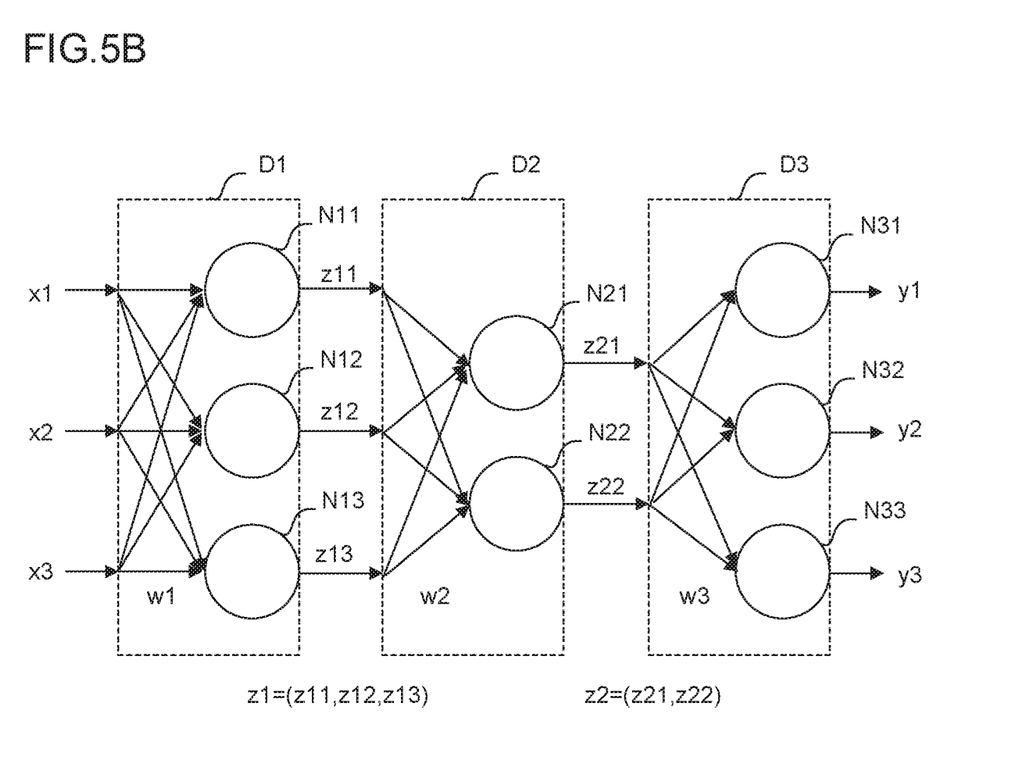
FIG. 5B illustrates a neural network.

When the above-described reinforcement learning is advanced, a neural network, for example, is applicable. FIG. 5A schematically illustrates a model of a neuron. FIG. 5B schematically illustrates a model of a three-layered neural network which is configured by combining the neurons illustrated in FIG. 5A. The neural network can be composed of arithmetic devices, storage devices, or the like, for example, in imitation of the model of neurons.

The neuron illustrated in FIG. 5A outputs a result y with respect to a plurality of inputs x (input $x_1$ to input $x_3$ as an example here). Inputs $x_1$ to $x_3$ are respectively multiplied by weights w ($w_1$ to $w_3$) corresponding to these inputs x. Accordingly the neuron outputs the output y expressed by Formula 2 below. Here, in Formula 2, all of input x, output y, and weight w are vectors. Further, θ denotes a bias and $f_k$ denotes an activation function.

$$y = f_k(\Sigma_{i=1}^{n} x_i w_i - \theta)$$ [Formula 2]

In the three-layered neural network illustrated in FIG. 5B, a plurality of inputs x (input x1 to input x3 as an example here) are inputted from the left side and results y (result y1 to result y3 as an example here) are outputted from the right side. In the example illustrated in FIG. 5B, inputs x1, x2, x3 are each multiplied by corresponding weights (collectively denoted by w1) and each of inputs x1, x2, x3 is inputted into three neurons N11, N12, N13.

In FIG. 5B, an output of each of the neurons N11, N12, N13 is collectively denoted by z1. z1 can be considered as a feature vector obtained by extracting a feature amount of an input vector. In the example illustrated in FIG. 5B, feature vectors z1 are each multiplied by corresponding weights (collectively denoted by w2) and each of feature vectors z1 is inputted into two neurons N21, N22. Feature vector z1 represents a feature between weight w1 and weight w2.

In FIG. 5B, an output of each of the neurons N21, N22 is collectively denoted by z2. z2 can be considered as a feature vector obtained by extracting a feature amount of feature vector z1. In the example illustrated in FIG. 5B, feature vectors z2 are each multiplied by corresponding weights (collectively denoted by w3) and each of feature vectors z2 is inputted into three neurons N31, N32, N33. Feature vector z2 represents a feature between weight w2 and weight w3. Finally, neurons N31 to N33 respectively output results y1 to y3.

Here, the method of so-called deep learning in which a neural network having three or more layers is used may be employed as well.

In the machine learning device 100 included in the component supply device 1, the learning unit 110 performs calculation of the multilayer structure following the above-described neural network by using the state variable S and the determination data D as inputs x so as to be able to output operation parameters (results y) of the vibration unit 50. Further, in the machine learning device 100 included in the component supply device 1, the learning unit 110 performs calculation of the multilayer structure following the above-described neural network by using the neural network as a value function in the Q-learning and using the state variable S and the action a as inputs x so as to be able to output values (results y) of the action in this state as well. Here, operation modes of the neural network include a learning mode and a value prediction mode. For example, weight w can be learned by using a learning data set in the learning mode and value determination of an action can be performed by using the learned weight w in the value prediction mode. Here, detection, classification, inference, and the like can also be performed in the value prediction mode.

The above-described configuration of the component supply device 1 can be described as a machine learning method (or software) executed by the processor 101. This machine learning method is a machine learning method for learning operation parameters of the vibration unit 50. The machine learning method includes: a step for observing the vibration operation parameter data S1, the component arrangement data S2, and the component kind data S3 as the state variables S representing a current state of an environment in which a robot is controlled; a step for acquiring the determination data D representing a suitability determination result of the tray vibration action based on the determined operation parameters; and a step for learning the component arrangement data S2, the component kind data S3, and the operation parameters of the vibration unit 50 while associating the component arrangement data S2 and the component kind data S3 with the operation parameters of the vibration unit 50 by using the state variables S and the determination data D. In this method, the steps are performed by a CPU of a computer.

Figure 6:
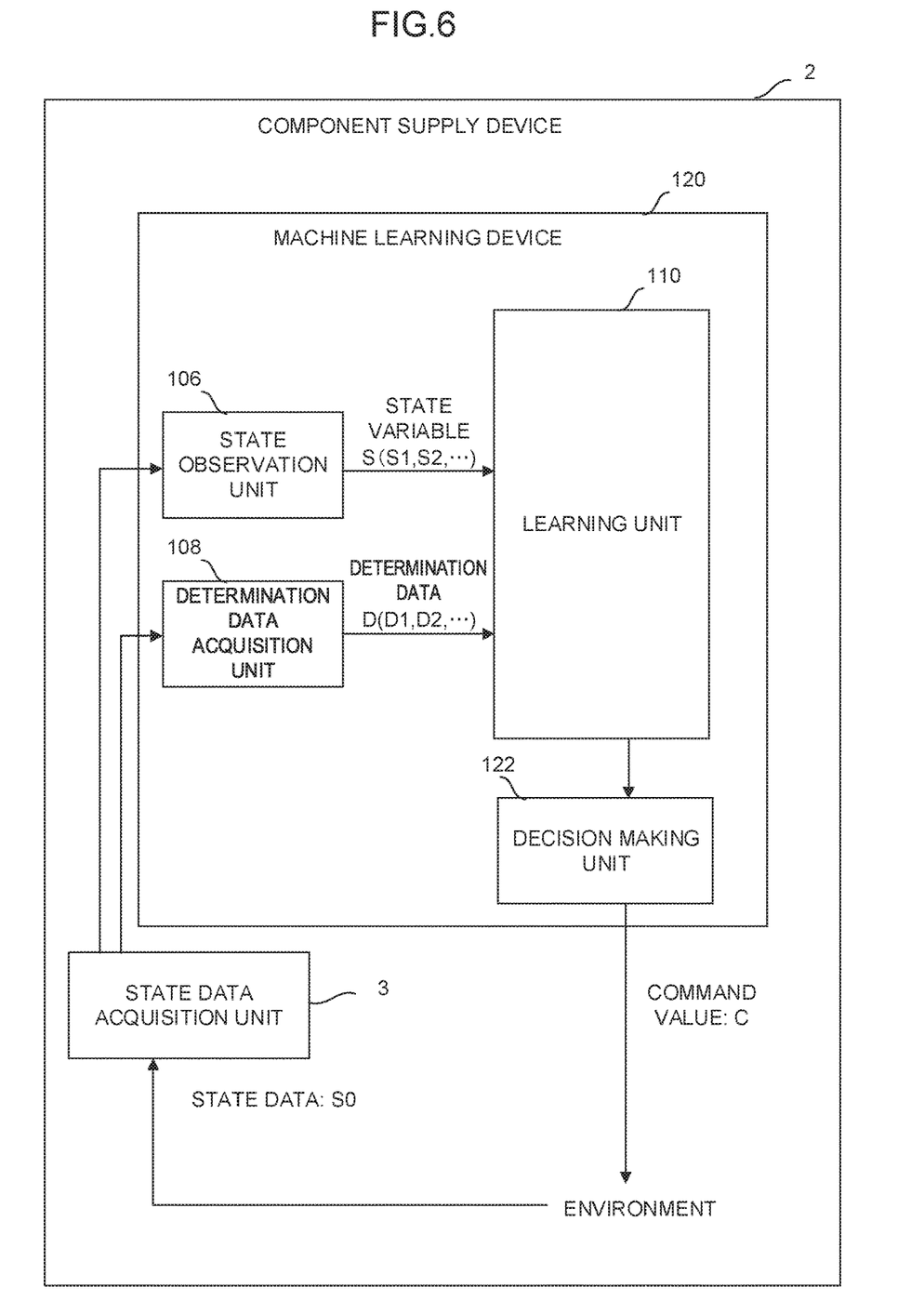
FIG. 6 is a schematic functional block diagram illustrating a component supply device according to the second embodiment.

FIG. 6 illustrates a component supply device 2 according to the second embodiment. The component supply device 2 includes a machine learning device 120 and a state data acquisition unit 3 which acquires the vibration operation parameter data S1, the component arrangement data S2, and the component kind data S3 which are the state variables S observed by the state observation unit 106 as state data S0. The state data acquisition unit 3 is capable of acquiring the state data S0 from each unit of the component supply device 2, an analysis result of an image picked up by the imaging unit 60, arbitrary data input by an operator, and the like.

The machine learning device 120 included in the component supply device 2 includes software (a learning algorithm and the like) and hardware (the processor 101 and the like) by which the machine learning device 120 learns operation parameters of the vibration unit 50 through machine learning by itself and further includes software (a calculation algorithm and the like) and hardware (the processor 101 and the like) by which the operation parameters of the vibration unit 50 obtained based on a learning result are outputted to the component supply device 2 as a command. The machine learning device 120 included in the component supply device 2 may have the configuration in which a single common processor executes all software such as a learning algorithm and a calculation algorithm.

A decision making unit 122 may be configured as one function of the processor 101, for example. Alternatively, the decision making unit 122 may be configured as software which is used for making the processor 101 function and is stored in the ROM 102, for example. The decision making unit 122 generates a command value C including a command for determining operation parameters of the vibration unit 50 with respect to an arrangement and postures of components on the tray 4 and kinds of the components based on a result learned by the learning unit 110, and outputs the generated command value C. In the case where the decision making unit 122 outputs the command value C to the component supply device 2, a state of an environment changes in response to the command value C.

The state observation unit 106 observes the state variables S, which are changed after the decision making unit 122 outputs the command value C to the environment, in the following learning period. The learning unit 110 learns operation parameters of the vibration unit 50 by updating the value function Q (that is, the action value table), for example, by using the changed state variables S. At this time, the state observation unit 106 may perform observation by acquiring the vibration operation parameter data S1 from the RAM 103 of the machine learning device 120 as described in the first embodiment, without acquiring the vibration operation parameter data S1 from the state data S0 acquired by the state data acquisition unit 3.

The decision making unit 122 outputs the command value C for commanding setting of operation parameters of the vibration unit 50, which are determined based on a learning result, to the component supply device 2. By repeating this learning period, the machine learning device 120 advances the learning of operation parameters of the vibration unit 50 and gradually improves reliability of operation parameters of the vibration unit 50 which are determined by the machine learning device 120.

The machine learning device 120 included in the component supply device 2 having the above-described configuration exhibits advantageous effects equivalent to those of the machine learning device 100 described above. The machine learning device 120, especially, is capable of changing a state of an environment with an output of the decision making unit 122. On the other hand, in the machine learning device 100, a function corresponding to the decision making unit for reflecting a learning result of the learning unit 110 to an environment may be obtained from an external device.

Figure 7:
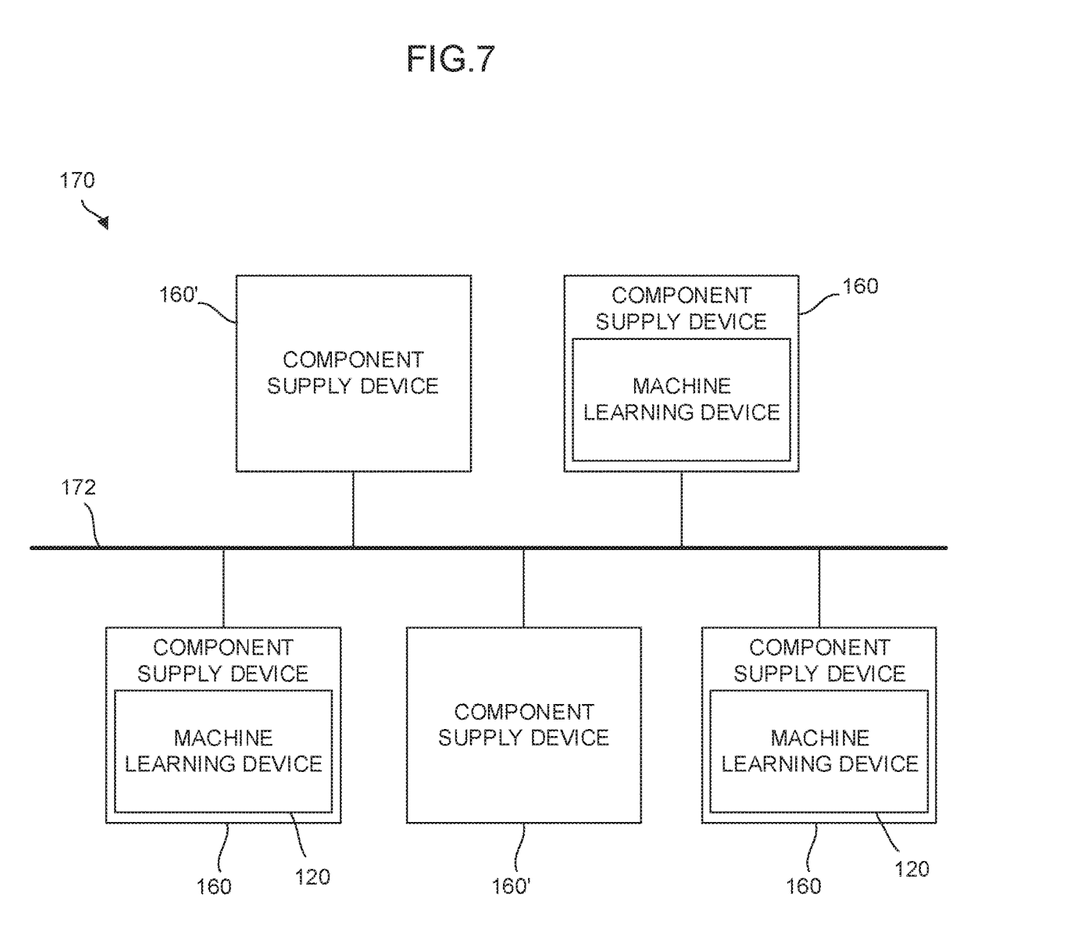
FIG. 7 is a schematic functional block diagram illustrating an aspect of a system in which component supply devices are incorporated.

FIG. 7 illustrates a system 170 according to an embodiment that includes component supply devices 160. The system 170 includes at least a plurality of component supply devices 160, 160' which perform identical operations and a wired/wireless network 172 which connects these component supply devices 160, 160' to each other. At least one of a plurality of component supply devices 160 is configured as the component supply device 160 including the machine learning device 120 described above. Further, the system 170 can include the component supply device 160' which does not include the machine learning device 120. The component supply devices 160, 160' have the configuration required for an operation for the same purpose.

In the system 170 having the above-described configuration, the component supply device 160 including the machine learning device 120 among a plurality of component supply devices 160, 160' is capable of automatically and accurately obtaining operation parameters of the vibration unit 50 with respect to an arrangement and postures of components on the tray 4 and kinds of the components by using a learning result of the learning unit 110 without depending on calculation or estimation. Further, the system 170 may be configured so that the machine learning device 120 of at least one component supply device 160 learns operation parameters of the vibration unit 50 common to all of the component supply devices 160, 160' based on the state variables S and the determination data D, which are each obtained for other component supply devices 160, 160', and all the component supply devices 160, 160' share the learning result. According to the system 170, speed and reliability in learning of operation parameters of the vibration unit 50 can be improved by using more various data sets (including the state variables S and the determination data D) as inputs.

Figure 8:
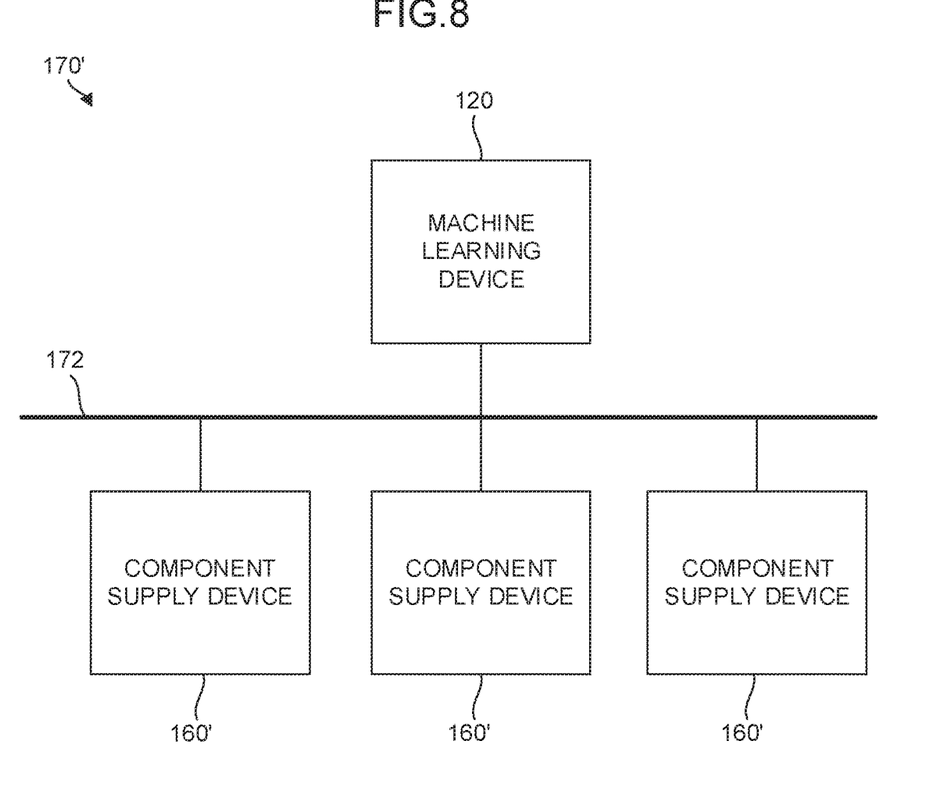
FIG. 8 is a schematic functional block diagram illustrating another aspect of a system in which component supply devices are incorporated.

FIG. 8 illustrates a system 170' according to another embodiment that includes component supply devices 160'. The system 170' includes the machine learning device 120 (or 100), a plurality of component supply devices 160' which have the identical mechanical configurations, and the wired/wireless network 172 which connects these component supply devices 160' and the machine learning device 120 (or 100) with each other.

In the system 170' having the above-described configuration, the machine learning device 120 (or 100) learns operation parameters of the vibration unit 50, which are common to all of the component supply devices 160', with respect to an arrangement and postures of components on the tray 4 and kinds of the components based on the state variable S and the determination data D, which are each obtained for a plurality of component supply devices 160' and accordingly, the machine learning device 120 (or 100) is capable of automatically and accurately obtaining the operation parameters of the vibration unit 50 with respect to an arrangement and postures of components on the tray 4 and kinds of the components by using the learning result without depending on calculation or estimation.

The system 170' may have the configuration in which the machine learning device 120 (or 100) exists in a cloud server prepared in the network 172. According to this configuration, required number of pieces of component supply devices 160' can be connected to the machine learning device 120 (or 100) when required, irrespective of a place or time on/in which each of a plurality of component supply devices 160' exists.

An operator engaged in the systems 170 and 170' can execute determination of whether or not the level of achievement of learning of operation parameters of the vibration unit 50 performed by the machine learning device 120 (or 100) (that is, reliability in operation parameters of the vibration unit 50) has reached a required level, at appropriate time after the start of the learning by the machine learning device 120 (or 100).

The embodiments of the present invention have been described above, but the present invention can be embodied in various aspects by adding arbitrary alterations, without being limited to the examples of the above-described embodiments.

For example, the learning algorithm executed by the machine learning devices 100 and 120, the calculation algorithm executed by the machine learning device 120, the control algorithm executed by the component supply devices 1 and 2, and the like are not limited to the above-mentioned algorithms, but various algorithms may be employed.

The above-described embodiments include the description that the component supply device 1 (or 2) and the machine learning device 100 (or 120) are devices including CPUs different from each other, but the machine learning device 100 (or 120) may be realized by the CPU 11 included in the component supply device 1 (or 2) and the system program stored in the ROM 12.

Further, the above-described embodiments provide the example in which the state observation unit 106 observes the component kind data S3, which represents kinds of components, as a state variable. However, in the case where the learning by the machine learning device 100 (or 120) is specialized for a correlation between an operation parameters of a vibration action for a specific component and an arrangement of components on the tray 4, the state observation unit 106 does not always have to observe the component kind data S3 as a state variable. Though the machine learning device 100 (or 120) which thus performs learning by observing only the vibration operation parameter data S1 and the component arrangement data S2 as state variables cannot be used for determination of operation parameters for the vibration operation of the vibration unit 50 for various components, this machine learning device 100 (or 120) can be used for determination of operation parameters for the vibration operation of the vibration unit 50 for a specific component which is a learning object (determination of operation parameters corresponding to a size, a weight, and a shape of the component concerned) with no problems. Further, it is enough for this machine learning device 100 (or 120) to advance learning for only a specific component which is the learning object, so that there are such merits that a speed of the learning of operation parameters of the vibration unit 50 is improved and the component supply device 1 (or 2) and the machine learning device 100 (or 120) can be supplied to a market early.

The embodiments of the present invention have been described above, but the present invention is not limited to the examples of the above-described embodiments and can be embodied in other aspects by adding arbitrary alterations.

The invention claimed is:

1. A component supply device for supplying a plurality of components scattered and placed on a tray and determining operation parameters for a vibration operation of the tray through which an arrangement and a posture of each of the plurality of components scattered and placed on the tray are changed, the component supply device comprising:
   a machine learning device configured to learn the operation parameters for the vibration operation, wherein the machine learning device includes a processor configured to:
   observe state variables representing a current state of an environment, the state variables including:
   vibration operation parameter data representing the operation parameters for the vibration operation, and component arrangement data representing the arrangement and the posture of each of the plurality of components on the tray, acquire determination data representing a suitability determination result of the vibration operation, the suitability determination result representing efficiency in supply of the plurality of components, and by using the state variables and the determination data, learn the operation parameters for the vibration operation and the component arrangement data while associating the operation parameters for the vibration operation with the component arrangement data, wherein the operation parameters include at least one of time of vibration and a chase difference of the vibration operation.

2. The component supply device according to claim 1, wherein the operation parameters include at least one of a magnitude of vibration and a frequency of vibration of the vibration operation.

3. The component supply device according to claim 1, wherein
   the state variables further include component kind data representing a kind of the plurality of components, and
   the processor is further configured to, by using the state variables and the determination data, learn the operation parameters for the vibration operation, the component arrangement data, and the component kind data while associating the operation parameters for the vibration operation with the component arrangement data and the component kind data.

4. The component supply device according to claim 1, wherein
   the determination data includes:
   a suitability determination result of a number of components being fallen from the tray, and
   the suitability determination result of the vibration operation representing the efficiency in supply of the plurality of components.

5. The component supply device according to claim 1, wherein the processor is further configured to calculate the state variables and the determination data in a multilayer structure.

6. The component supply device according to claim 1, wherein
   the processor is further configured to output a command value for determining the operation parameters for the vibration operation, based on a learning result.

7. The component supply device according to claim 1, wherein the machine learning device exists in a cloud server.

8. The component supply device according to claim 1, wherein the operation parameters are determined in accordance with at least one of a weight, a size and a shape of the plurality of components.

9. The component supply device according to claim 1, wherein
   the processor is further configured to:
   obtain a reward related to the suitability determination result, and by using the reward, update a function representing values of the operation parameters for the vibration operation with respect to the arrangement and the postures of the plurality of components on the tray.

10. The component supply device according to claim 1, wherein the processor is further configured to learn the operation parameters for the vibration operation in each of a plurality of component supply devices by using the state variables and the determination data, the state variables and the determination data being obtained for each of the plurality of component supply devices.

11. A component supply device that supplies a plurality of components placed on a tray and determines operation parameters for a vibration operation of the tray through which the arrangement and the postures of the components placed on the tray are changed, the component supply device comprising:
   a machine learning device that learns the operation parameters for the vibration operation, wherein
   the machine learning device includes
      a state observation unit that observes vibration operation parameter data representing the operation parameters for the vibration operation and component arrangement data representing the arrangement and the postures of the components on the tray, as state variables representing the current state of the environment,
      a determination data acquisition unit that acquires determination data representing a suitability determination result of the vibration operation, the suitability determination result representing efficiency in supply of the components, and
      a learning unit that learns the operation parameters for the vibration operation and the component arrangement data while associating the operation parameters for the vibration operation with the component arrangement data, by using the state variables and the determination data,
   wherein the learning unit includes:
      a reward calculation unit that obtains a reward related to the suitability determination result; and
      a value function update unit that updates a function representing the values of the operation parameters for the vibration operation with respect to the arrangement and the postures of the components on the tray by using the reward.

12. A component supply device that supplies a plurality of components placed on a tray and determines operation parameters for a vibration operation of the tray through which the arrangement and the postures of the components placed on the tray are changed, the component supply device comprising:
   a machine learning device that learns the operation parameters for the vibration operation, wherein
   the machine learning device includes
      a state observation unit that observes vibration operation parameter data representing the operation parameters for the vibration operation and component arrangement data representing the arrangement and the postures of the components on the tray, as state variables representing the current state of the environment,
      a determination data acquisition unit that acquires determination data representing a suitability determination result of the vibration operation, the suitability determination result representing efficiency in supply of the components, and
      a learning unit that learns the operation parameters for the vibration operation and the component arrangement data while associating the operation parameters for the vibration operation with the component arrangement data, by using the state variables and the determination data,
   wherein the learning unit learns the operation parameters for the vibration operation in each of a plurality of component supply devices by using the state variables and the determination data, the state variables and the determination data being obtained for each of the plurality of component supply devices.

13. A machine learning device for learning-operation parameters for a vibration operation of a tray through which an arrangement and a posture of each of a plurality of components scattered and placed on the tray are changed in a component supply device for supplying the plurality of components placed on the tray, the machine learning device comprising: a processor configured to:
   Observe state variables representing a current state of an environment, the state variables including:
   vibration operation parameter data representing the operation parameters for the vibration operation, and component arrangement data representing the arrangement and the posture of each of the plurality of components on the tray;
   acquire determination data representing a suitability determination result of the vibration operation, the suitability determination result representing efficiency in supply of the plurality of components, and by using the state variables and the determination data, learn the operation parameters for the vibration operation and the component arrangement data while associating the operation parameters for the vibration operation with the component arrangement data, wherein the operation parameters include at least one of time of vibration and a phase difference of the vibration operation.

* * * * *